(12) United States Patent
Hassle

(10) Patent No.: US 9,560,813 B2
(45) Date of Patent: Feb. 7, 2017

(54) BUILDING WITH INTEGRATED GREENHOUSE

(71) Applicant: Plantagon International AB, Stockholm (SE)

(72) Inventor: Hans Hassle, Katrineholm (SE)

(73) Assignee: PLANTAGON INTERNATIONAL AB, Stockholm (SE)

( * ) Notice: Subject to any disclaimer, the term of this patent is extended or adjusted under 35 U.S.C. 154(b) by 471 days.

(21) Appl. No.: 13/667,246

(22) Filed: Nov. 2, 2012

(65) Prior Publication Data
US 2013/0104452 A1    May 2, 2013

Related U.S. Application Data

(60) Provisional application No. 61/554,734, filed on Nov. 2, 2011.

(51) Int. Cl.
*A01G 9/14*    (2006.01)
*A01G 31/04*    (2006.01)

(52) U.S. Cl.
CPC ............... *A01G 9/14* (2013.01); *A01G 31/042* (2013.01); *Y02P 60/216* (2015.11)

(58) Field of Classification Search
CPC ............ A01G 9/14; A01G 9/24; A01G 1/001; A01G 1/042; A01G 31/042
USPC ........ 47/17, 59 R, 62 R, 62 A, 62 N, 39, 65, 65.5, 47/66.6, 66.7, 67, 82, 83
See application file for complete search history.

(56) References Cited

U.S. PATENT DOCUMENTS

| | | | | |
|---|---|---|---|---|
| 2,244,677 | A | * | 6/1941 | Cornell .............................. 47/17 |
| 3,327,425 | A | * | 6/1967 | Dosedla et al. .................. 47/60 |
| 3,771,258 | A | * | 11/1973 | Charney ........................... 47/65 |
| 4,068,405 | A | | 1/1978 | Campbell et al. |
| 4,077,158 | A | * | 3/1978 | England ........................ 47/59 R |
| 4,163,342 | A | * | 8/1979 | Fogg et al. ................. 47/58.1 R |
| 8,627,598 | B1 | * | 1/2014 | Souder et al. .................... 47/65 |
| 2009/0307973 | A1 | | 12/2009 | Adams et al. |
| 2011/0131876 | A1 | | 6/2011 | Pettibone |
| 2012/0060414 | A1 | * | 3/2012 | Olsson ............................. 47/65 |
| 2013/0104453 | A1 | * | 5/2013 | Hassle ............................. 47/17 |

FOREIGN PATENT DOCUMENTS

| | | |
|---|---|---|
| CN | 201682843 U | 12/2010 |
| CN | 102067794 A | 5/2011 |
| CN | 201888129 U | 7/2011 |

(Continued)

*Primary Examiner* — Trinh Nguyen
(74) *Attorney, Agent, or Firm* — Birch, Stewart, Kolasch & Birch, LLP

(57) ABSTRACT

A high-rise building (1) is described, which comprises a building structure (2) with floor structures (3), a double-skin façade comprising a first skin (5) and a second skin (6). The high-rise building also comprises at least one conveying system (7, 7', 7") arranged between the skins (5, 6) of the double-skin façade and arranged for moving trays (8) vertically between the skins (5, 6) between a starting position (9, 9', 9") and an end position (10, 10', 10"). The conveying system (7, 7', 7") comprises essentially horizontal track portions (14) each having a length axis (15), track connecting means (18) which connect the track portions (14), and conveying means for movement of the trays (8) along the length axis (15) of the track portions (14) and along the track connecting means (19).

14 Claims, 5 Drawing Sheets

(56) References Cited

FOREIGN PATENT DOCUMENTS

| | | |
|---|---|---|
| EP | 0060828 A2 | 9/1982 |
| EP | 0142643 A2 | 5/1985 |
| EP | 2486783 A1 | 8/2012 |
| GB | 922293 A | 3/1963 |
| JP | 1-235524 A | 9/1969 |
| JP | 51-22551 | 2/1976 |
| JP | 52-98128 A | 8/1977 |
| JP | 11-98928 A | 4/1999 |
| JP | 2000-106776 A | 4/2000 |
| JP | 2000-224933 A | 8/2000 |
| JP | 2003-23887 A | 1/2003 |
| JP | 2008-136945 A | 6/2008 |
| NL | 8700775 A | 11/1988 |
| NL | 9000097 | 8/1991 |
| WO | 2010/122183 A1 | 10/2010 |
| WO | WO 2010/138027 * | 12/2010 |

* cited by examiner

BUILDING WITH INTEGRATED GREENHOUSE

TECHNICAL FIELD

The present invention relates to a high-rise building. More specifically the present invention relates to a high-rise building with a double-skin façade.

DESCRIPTION OF THE PRIOR ART

In densely populated areas the price on land is usually high. In such areas it is common with high-rise buildings in order to use the ground space as efficiently as possible and to thus minimize the cost per square meter space in the building. Buildings that are situated in hot climates have to be equipped with cooling systems in order to provide a desirable interior climate in the building. In order to minimize the operating costs of the building it is desirable to minimize the energy consumption. One way to lower the energy consumption is to provide the building with a double-skin façade. Another problem in urbanized areas is that food, once grown and harvested, must travel long distances to reach the consumers in the cities. Such food transports consume energy and adds to the traffic congestion in the cities. Growing food crops on or in buildings can help reduce our environmental footprint, cut transportation costs, enhance food security, save energy within the building envelope and enrich the physical and psychological comfort of building occupants.

The patent application US 2009/0307973 A1 describes a vertically-integrated greenhouse which provides a system of food production in buildings and which can be installed in a double-skin façade. In addition to producing food the greenhouse is also intended to reduce building maintenance costs by offering shade, air treatment and evaporative cooling to building occupants. In the greenhouse, trays with plants are arranged and are affixed to a tray suspension system to which the trays are adjustably affixed one above another in parallel vertical rows and can be vertically raised or lowered. However, a major disadvantage with this system is that the distance between the trays has to be increased as the plants grow which limits the number of trays in circulation. Hence, this system is not adapted for large scale production of plants and crops. Moreover, as the plants grow, and the distance between the trays have to be adjusted, the plants are not properly aligned with each floor level of the building which is a disadvantage since proper shading cannot be provided for each floor level. It is therefore desirable to develop a high-rise building with an integrated greenhouse in which the number of trays, and thereby the capacity to grow plants and crops, as well as providing shade, is not affected by the size of the plants and crops.

The patent application EP0060828 A2 relates to a greenhouse in which containers for receiving cultivated plants are guided along meandering paths. The containers are moved horizontally by means of rollers on guides that are formed as rails. The guides are inclined and the movement of containers are thus achieved by gravitational force, i.e. containers roll down the rails. The vertical movement is achieved by lifting devices. However, there are several disadvantages with this system including the fact that this system is not intended for trays that comprise a plurality of pots. The rails are neither constructed for carrying trays nor is it indicated in the document that the rails could be adapted for such a task. Hence, it is not a system for large scale production of plants and crops since the number of plants that circulate in the system is highly limited. Furthermore, it is not indicated that this system is modifiable for integration with a high-rise building; hence this system cannot provide shade, insulation and/or oxygen to the inhabitants of a high-rise building. More importantly, the horizontal conveying of the containers is dependent on the inclination of the rails which makes it impossible to move the containers in both horizontal directions which renders this system highly inflexible. The inflexibility is particularly apparent when the trays have to be moved so that the plants can (i) receive maximum amount of sunlight, or (ii) provide shading for specific parts of the building. It is therefore desirable to develop a system for large scale production of plants and crops which can be integrated with a high rise building. Moreover, in order to achieve high flexibility, it is desirable that the plants and crops can be moved in both horizontal directions, and even more desirable that the horizontal movement of plants and crops is not dependent on inclination of the rails.

Hence, in summary, it is desirable to have a high-rise building with an integrated greenhouse which can provide (i) more crops and plants, as well as (ii) a more flexible system for moving trays within the integrated greenhouse.

SUMMARY OF THE INVENTION

An important objective of the present invention is to provide a high-rise building with an integrated greenhouse which can provide a higher surface area for the crops to grow in and thereby provide means for large scale production of crops.

A further important objective of the invention is to provide a horizontal movement of trays in order to provide flexible transport of a large number of plants and crops.

An important objective of the invention is also to provide vertical movement of trays in order to provide flexible transport of a large number of plants vertically.

A further objective of the invention is that the high-rise building and the double-skin façade are fully integrated in the sense that (a) the carbon dioxide and excess heat of the exhaust air from the high-rise building is led to the double-skin façade, (b) oxygen in the exhaust air from the double-skin façade is led to the high-rise building, (c) the high-rise building is insulated by the double-skin façade, and (d) the double-skin façade provides shading of the building.

Another objective of the present invention is to provide a high-rise building with an integrated greenhouse which requires a minimum of additional load supporting structures.

A further objective of the present invention is to provide a high-rise building with an integrated greenhouse which is easily maintainable and which requires a minimum of additional energy for its operation.

At least one of these objectives is provided with a high rise building according to the independent claim.

Additional advantages are provided with the features of the dependent claims.

According to a first aspect of the present invention a high-rise building is provided comprising a building structure with floor structures, a double-skin facade and at least one conveying system arranged between the skins of the double-skin façade and arranged for moving trays vertically between the skins between a starting position and an end position.

The high-rise building is characterized in that the conveying system comprises essentially horizontal track portions each having a length axis, track connecting means which connect the horizontal track portions, and conveying means for movement of the trays along the length axis of the track portions and along the track connecting means. The track portions do not have to be straight but may be bent. Thus, the length axis do not have to be straight lines.

Preferably, pots with plants are to be arranged in the trays. Alternatively plants may be planted directly into the trays without pots.

With a high-rise building according to the invention a number of advantages are achieved. The arrangement of an integrated greenhouse on the façade of the building provides for heat insulation of the building which lowers the need for heating and cooling of the building. Furthermore, plants that are arranged in the trays provide shading for the building. By having the track portions essentially horizontal they are more easily integrated with the building as the floor structures of the building are also essentially horizontal. The track connecting means are arranged to transport trays from one track portion to the next.

Preferably the track portions are attached to the floor structures of the building structure. In this way some of the necessary support for the conveying system is provided from the building structure. This will facilitate the construction of the conveying system compared to the conveying systems of the prior art. Furthermore, the integration of the conveying system with the building structure makes it possible with very high conveying systems.

The trays may be elongated trays with a length axis and may be arranged for placement of pots in at least one row along the length axis. The track portions may be arranged for trays to be arranged with their length axis perpendicular to the length axis of the track portions. By having the trays arranged in this way the distance between the pots is easily adjustable in one dimension by adjusting the distance between the pots along the track portions. Thus, the distance between the trays may be enlarged as the plants grow and extend outside the trays.

The conveying means may comprise at least one conveyor belt for each track portion for movement of the trays along the track portions. Conveyor belts have been used in a large number of applications for a long time and provide a relatively uncomplicated solution for transportation of trays.

The conveyor belts may be arranged for stepwise movement of the trays. Alternatively the conveyor belts may be arranged for continuous movement of the trays. However, as the desired average speed of the trays is very low it might be difficult to provide a continuous movement of the trays.

The conveying means may comprise a conveying device which is arranged to travel along at least one track portion and comprises a tray moving unit, which after passing a tray is arranged to move at least one tray one step along the track portion, the conveying device thus moving trays stepwise along the at least one track portion during the travel along the at least one track portions. Such a device is more suitable for the very low average speed that is desired. The conveying device may be a robot. Depending on the construction of the track connecting means the robot may be arranged to travel between different track connecting means.

In case a conveying device as described above is used to transport the trays each one of the track portions may comprise a first beam and a second beam, wherein the first beam is arranged to support the end of the tray being closest to the building. The conveying device may be suspended in one of beams. The beams provide passive track portions. With such track portions the movement of the trays depends on the conveying device, which may relatively easily be replaced in case it breaks down.

The second beam of each track portion is arranged to support the opposite end of the tray. The trays thus rest on the beams at the ends of the trays. According to an alternative embodiment the track portions may be arranged for two or more parallel lines of trays. In case of two parallel lines of trays the track portions may comprise three beams of which the middle beam supports the ends of trays in both lines.

When having only one line of trays the second beam of each track portion may be arranged to support the tray at an intermediate position between the ends of the tray. An advantage of such a design is that the unsupported length of the trays is minimized. This lowers the demands on the stiffness of the trays.

The high-rise building may comprise watering means to intermittently provide water to the trays on the track portions. This is a way of providing water to the pots which requires a minimum amount of water while simultaneously being relatively simple to implement.

The watering means may comprise water outlets, which preferably are arranged at a distance corresponding to the intended pitch between the trays. The trays are then preferably moved stepwise between the positions of the water outlets. By providing water to the trays the pots in the trays may absorb water, whereby the plants are watered.

The track portions may be arranged so that the trays incline at an angle of 0, 5-2 degrees when they are arranged on the track portion and wherein the water outlets are arranged at the beam arranged at the higher level. When water is provided to the higher end of the tray it flows down along the tray. In this way all pots in the tray are provided with water.

The high-rise building may comprise a water return system which is arranged to collect residual water from the trays at the lower side of the track portion. This provides a good control over the water in the high-rise building. The water may be returned to the trays after addition of, e.g. nutrients.

The track connecting means may be arranged for transportation of trays with their length axis parallel to their direction of transportation. This provides for a compact installation as the track connecting means then may be made narrow. The track connecting means may in principle consist of slides along which the trays slide from one track portion to another. Thus, the conveying means for movement of the trays along the length axis consist of the inclination of the paths.

As an alternative the track connecting means may be arranged as inclining continuations of the track portions. This has the advantage that the conveying device then may easily travel along more than one track portion.

It is also possible to arrange the track connecting means with an elevator that is arranged to transport the trays vertically from one track portion to another. It is also possible to combine such an elevator with means for horizontal transport.

In case the high-rise building is surrounded by other high-rise buildings sun may be partly blocked from the lower parts of the high-rise building. In that case the high-rise building may be arranged with track portions arranged only on the upper part of the building. Track portions may be arranged on no more than the upper half of the building, preferably no more than on the upper third part of the building. On the lower parts of the building the entire width of the building may be used for office space or living space.

The high-rise building may comprise at least two conveying systems arranged on top of each other, so that the at least two start positions and two end positions are provided, providing for the simultaneous growth of two different plant varieties in two different parts of the double-skin façade. The climate, i.e., the humidity and temperature may then be different in the different parts of the double-skin façade.

The outlet for exhaust air from the building may be connected to the air inlet of the double-skin façade via an air filter. In this way the carbon dioxide and excess heat of the exhaust air from the building may be utilized in the greenhouse in the double-skin façade. The air filter removes any bacteria from the air.

The outlet for exhaust air from the double-skin façade may be connected to the air inlet of the building via an air filter. In this way the oxygen in the exhaust air from the double-skin façade may be used in the building. The air filter removes any bacteria from the air.

The inlet for air into the double-skin façade is preferably arranged at the bottom of the double-skin façade as it is then easier to provide an air flow in the double-skin façade.

SHORT DESCRIPTION OF THE DRAWINGS

In the following preferred embodiments of the invention will be described with reference to the appended drawings on which:

Figure 1:
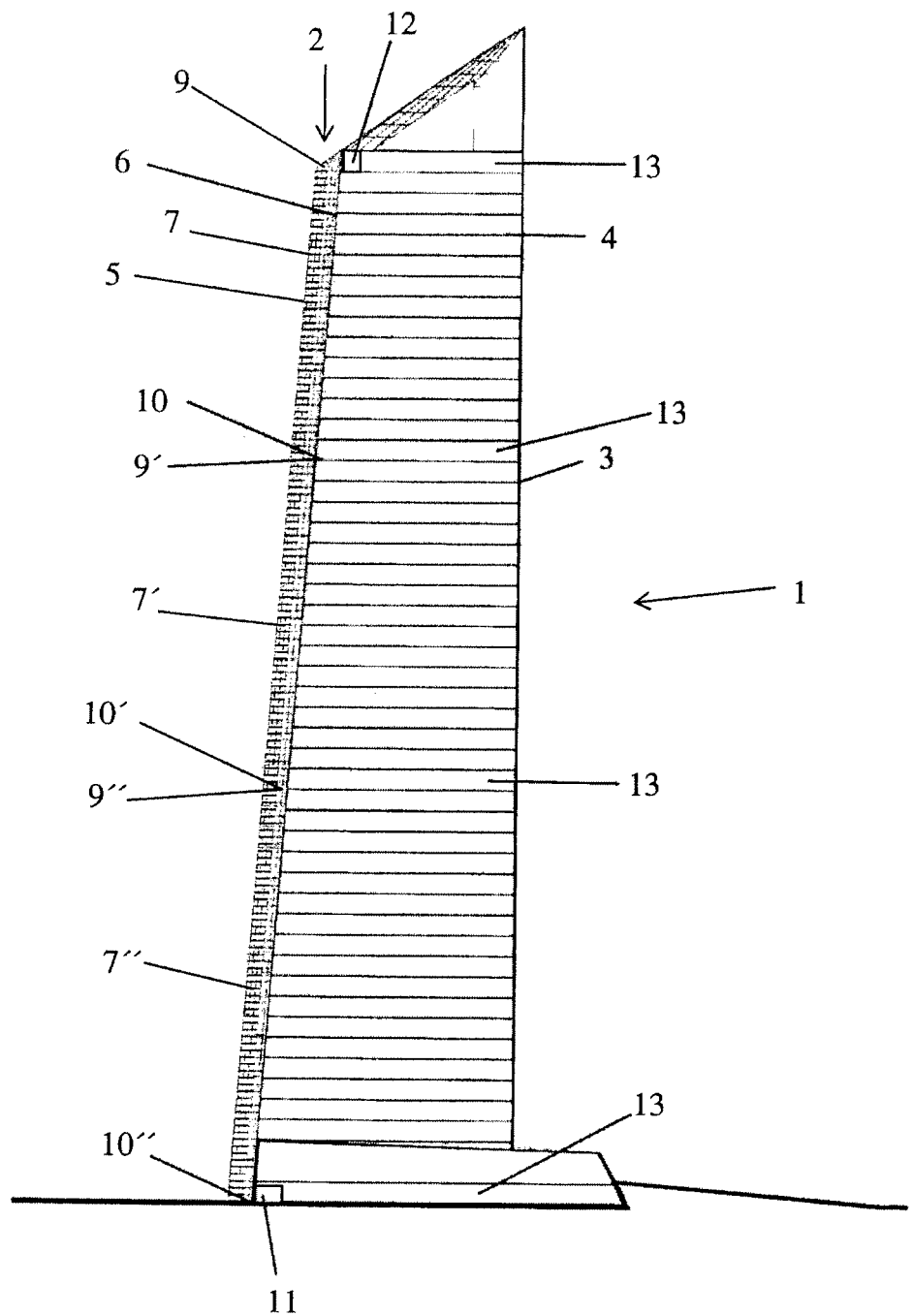
FIG. 1 shows schematically, partly in cross-section, a high rise building with an integrated greenhouse according to an embodiment of the present invention.

DESCRIPTION OF PREFERRED
EMBODIMENTS OF THE INVENTION

In the following description of preferred embodiments of the invention similar features in different figures will be denoted with the same reference numeral. It is to be noted that the drawings are not drawn to scale.

FIG. 1 shows schematically, partly in cross-section, a high-rise building 1 with an integrated greenhouse 2 according to an embodiment of the present invention. The high-rise building comprises a building structure 3 with floor structures 4, and a double-skin façade having an outer skin 5 and an inner skin 6. The high-rise building 1 comprises three conveying systems 7, 7', and 7", arranged on top of each other, so that three start positions 9, 9', and 9", and three end positions 10, 10', and 10", are provided, providing for the simultaneous growth of three different plants. The conveying systems 7, 7', and 7", are arranged between the skins 5, 6, and are arranged for moving trays 8 (FIG. 3) vertically between the skins 5, 6, from starting positions 9, 9', and 9", downwards to end positions 10, 10', and 10". The conveying systems 7, 7', and 7", comprise essentially horizontal track portions 11 (FIG. 3) which are attached to the floor structures 4 of the building structure 3.

Service floors 13 are provided at the starting positions 9, 9', and 9", and at the end positions 10, 10', and 10". At the service floors 13 the sowing of seeds and harvesting of grown plants is performed.

The outlet for exhaust air from the building is connected to the air inlet of the double-skin façade via an air filter 11 arranged at the bottom of the double-skin façade. The outlet for exhaust air from the double-skin façade is connected to the air inlet of the building via a second air filter 12 arranged at the top of the double-skin façade.

Figure 2:
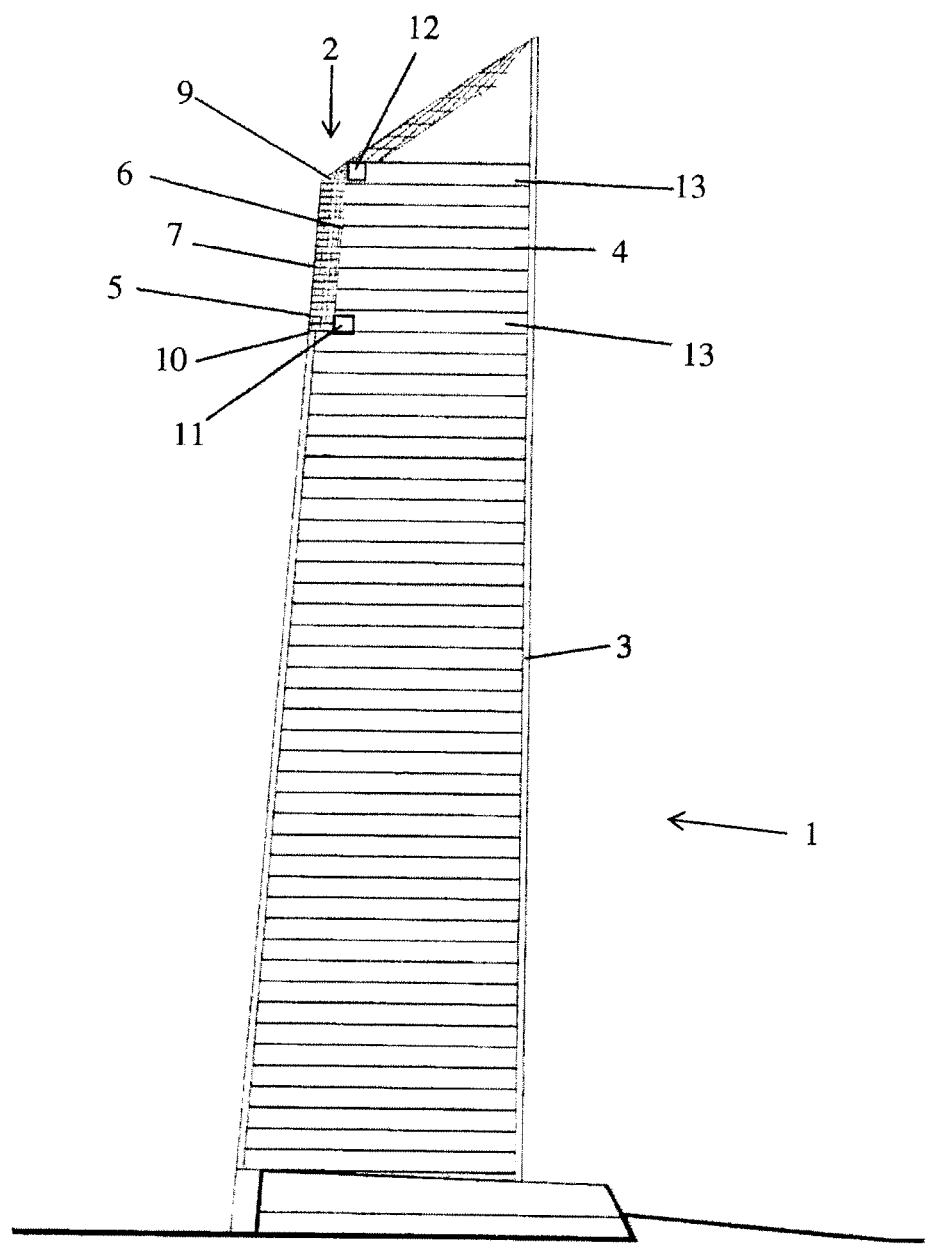
FIG. 2 shows schematically, partly in cross-section, a high rise building according to an alternative embodiment of the present invention in which a greenhouse is integrated only in the top part of the building.

FIG. 2 shows schematically, partly in cross-section, a high rise building 1 according to an alternative embodiment of the present invention in which a greenhouse 2 is integrated in the double skin façade only in the top part of the building 1. Only one conveying system 7 is provided in the building of FIG. 2 which is arranged for movement of trays 8 (FIG. 3) between a starting position 9 and an end position 10.

Figure 3:
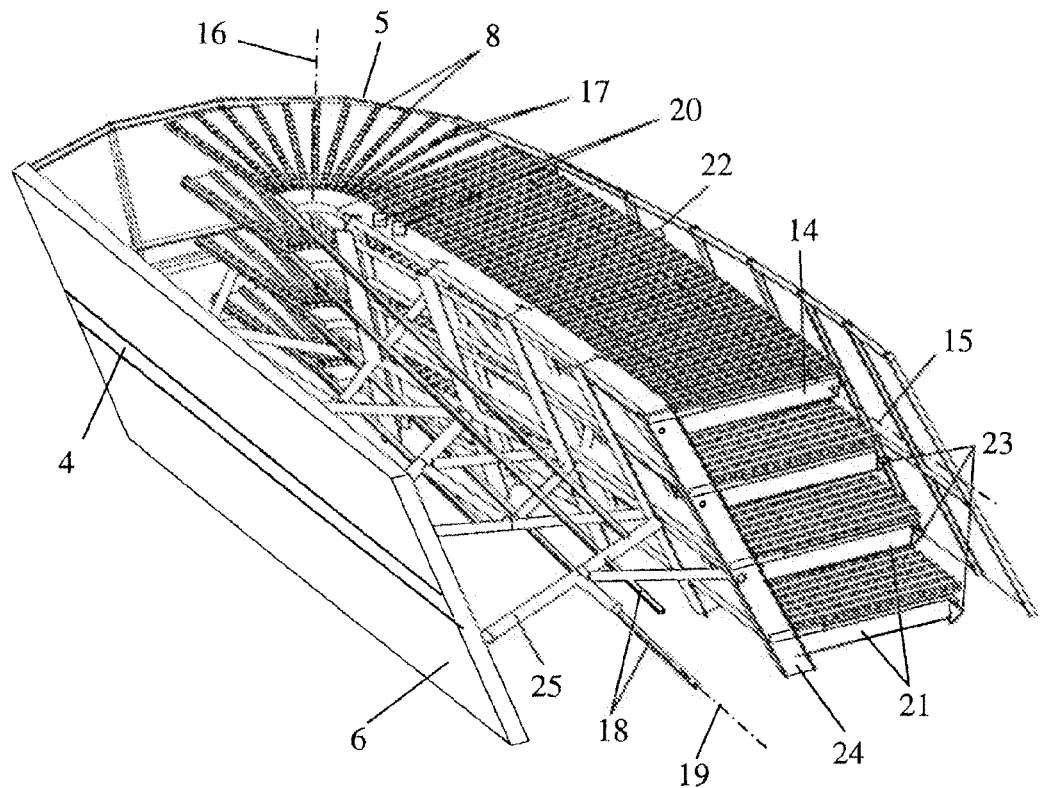
FIG. 3 is an enlargement of a part of the greenhouse in FIG. 1 and FIG. 2 in cross section with a track portion for the arrangement of trays with pots and plants according to an embodiment of the present invention.

FIG. 3 is a cutaway enlargement of a part of one conveying system 7 with track portions 14 with a length axis 15 for the arrangement of trays 8. The track portions 14 are arranged connected to a frame 24 which in turn is connected to the floor structures 4 by means of a connecting frame 25.

Figure 4:
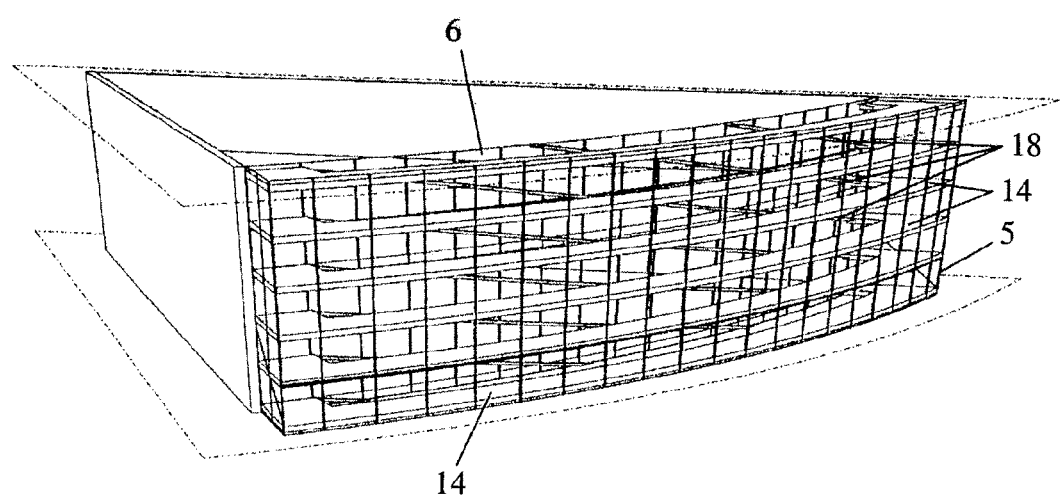
FIG. 4 is an enlargement of a part of the greenhouse in FIG. 1 and FIG. 2 with a track portion for the arrangement of trays with pots and plants according to an embodiment of the present invention.

FIG. 4 is an enlargement of a part of the greenhouse in FIG. 1 and FIG. 2 viewed from another angle.

The conveying system also comprises track connecting means 18, which each have a length axis and which connects one track portion 14 to a track portion 14 three levels below. The trays 8 are elongated with a length axis 16 and arranged for placement of pots 17 in a single row along the length axis 16 of the tray. Growing medium in which plants are to grow is arranged in the pots 17. The track portions 14 are arranged for trays 8 to be arranged with their length axis 16 perpendicular to the length axis 15 of the track portions 14. In the shown embodiment the track connecting means are arranged as inclining straight paths 18 with length axis 19, wherein the paths 18 are arranged for transportation of trays 8 with their length axis 16 parallel to their direction of transportation. The straight paths are arranged for the trays to slide down from one track portion 14 to the track portion 14 three levels below. The conveying means are arranged so that the trays enter the inclining straight paths 18 at the end of the track portions 14. Thus, in the embodiment shown in FIG. 3 and FIG. 4 three track portions 14 are arranged in parallel.

Alternatively, the track connecting means could be inclining continuations of the track portions 14.

It is also possible to use one or more elevators for vertical transport between the track portions. Such elevators may be combined with means for horizontal transport.

The conveying system 7 also comprises conveying means arranged to move trays 8 stepwise along the track portions 14. In the embodiment shown in FIG. 3 the conveying means is in the form of a conveyor belt 21.

Watering means in the form of water outlets 20 are provided to intermittently provide water to the trays 8 on the track portions 14. The water outlets 20 are arranged at a distance corresponding to the intended pitch 22 between the trays 8. In this way each one of the trays 8 may be provided with water at each time. The time interval between the points of time when the trays 8 are provided with water is adapted to the vegetable in the pots 17 of the tray 8.

The track portions 14 are arranged so that the trays 8 incline at an angle of 0, 5-2 degrees when they are arranged on the track portions 14. The water outlets 20 are arranged at the higher level. When water is provided to the trays 8 at the end being at a higher level the water will flow towards the end of the tray being at a lower level. During the flow the growing medium in the pots 17 may absorb the flowing water.

The conveying system 7 also comprises a water return system which is arranged to collect residual water from the trays at the beam arranged at the lower level. The water return system consists in the shown embodiment of a half-pipe 23 which runs along the lower side of the trays 8. Water that has not been absorbed by the growing medium in the pots 17 is collected by the half-pipe 23 on each level and is then transported to a vertical pipe (not shown) that is common to all levels.

Figure 5:
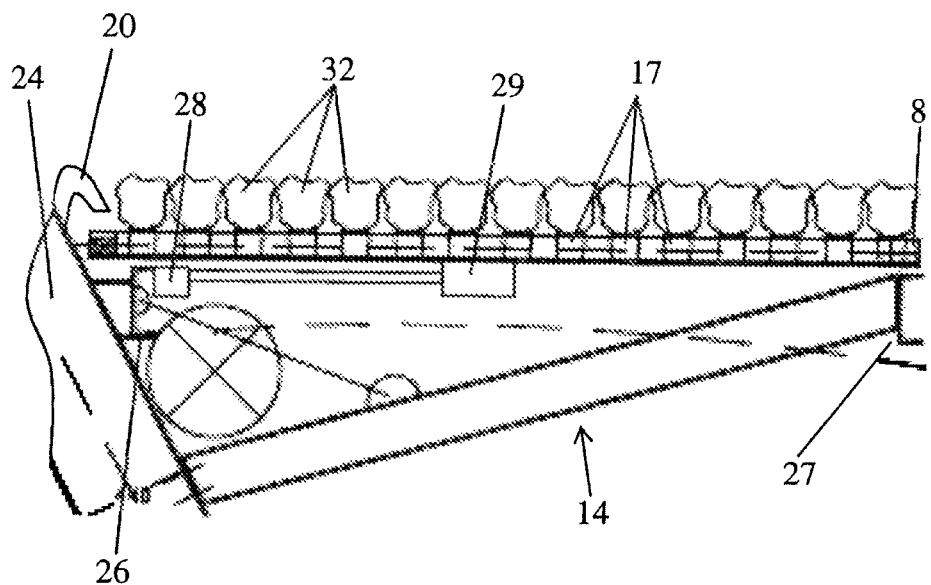
FIG. 5 shows a cross section of the track portion according to an embodiment of the invention.

FIG. 5 shows a cross section of the track portion 14 in more detail according to an embodiment of the invention. The track portion 14 comprises a first beam 26 and a second beam 27, which are both connected to the frame 24. A tray 8 with a number of pots 17 is arranged to be supported by the first beam 26 in one end of the tray 8 and by the second beam 27 in the other end of the tray 8. A conveying device 28 is arranged to travel along the first beam 26 and comprises a tray moving unit 29 which after passing a tray 8 is arranged to move the tray 8 one step along the track portion 14. Water outlets 20 are arranged at the first beam 26. Pots 17, in which plants 32 grow, are arranged in the trays 8.

Figure 6:
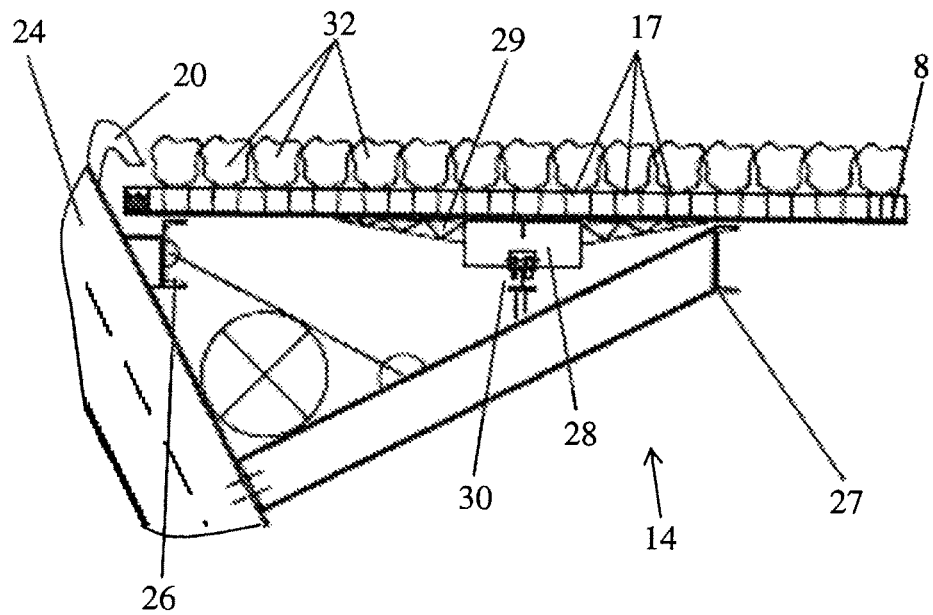
FIG. 6 shows a cross section of the track portion in more detail according to an alternative embodiment of the invention.

FIG. 6 shows a cross section of the track portion 14 in more detail according to an alternative embodiment of the invention. Only the differences between the embodiment of FIG. 5 and FIG. 6 will be described. The track portion 14 comprises a third beam on which the conveying device 28 is arranged. Furthermore, the second beam 27 is arranged supporting the tray 8 at a position between the ends of the tray 8.

Figure 7:
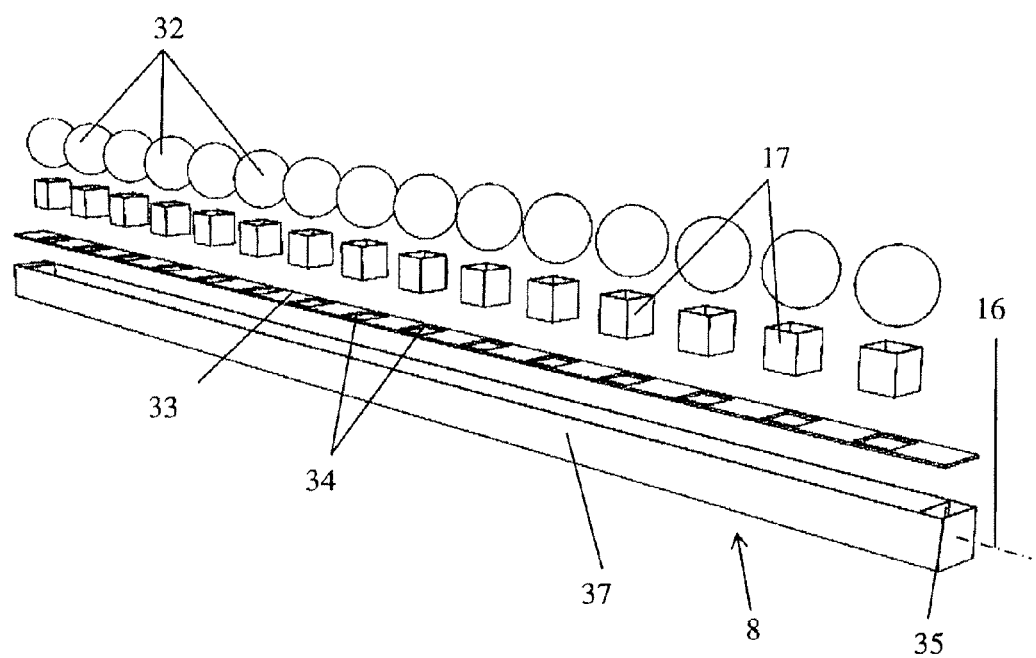
FIG. 7 is an exploded view of a tray with pots and plants.
Figure 8:
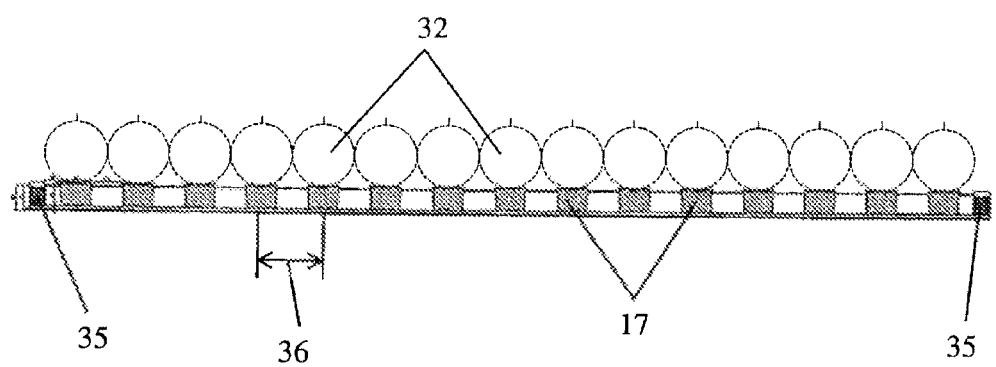
FIG. 8 shows a cross section of a tray with pots and plants.

FIG. 7 is an exploded view of a tray 8 with pots 17 and plants 32. FIG. 8 shows a cross section of a tray 8 with pots 17 with plants 32. As is shown in FIG. 7 the tray 8 consists of a bottom 37 and a lid 33. Holes 34 are formed in the lid in order to receive the pots 17. Water containers are formed at both ends of the tray 8.

The described embodiments may be amended in many ways without departing from the spirit and scope of the present invention, which is limited only by the claims.

It is of course possible to design the trays in differently from what has been shown in FIG. 7 and FIG. 8.

It is possible to move trays in the opposite direction to what has been described above.

The invention claimed is:

1. A high-rise building for cultivating crops in trays and having at least one conveying system for moving the trays, wherein at least one of the at least one conveying system comprises:
   a plurality of essentially horizontal track portions each having a length axis, wherein the track portions are attached to the floor structures of the building structure, the track portions extending in parallel to each other and being arranged above each other in a vertical plane,
   a conveyor for movement of trays having a respective length axis along the length axis of the track portions with the length axis of each tray being substantially perpendicular to the length axis of the track portions, and
   a plurality of track connectors, each track connector connects one track portion with another track portion located one or more levels below, for transportation of the trays, at least partly by gravity, along a length axis of the track connector, with the length axis of each tray in parallel with the length axis of the track connector.

2. The high-rise building according to claim 1, wherein the high-rise building comprises a building structure with floor structures, a double-skin façade comprising a first skin and a second skin and at least one conveying system arranged between the skins of the double-skin façade and arranged for moving trays vertically between the skins between a starting position and an end position.

3. The high-rise building according to claim 1, wherein the conveyor comprises a conveying device which is arranged to travel along at least one track portion and comprises a tray moving unit which after passing a tray is arranged to move at least one tray one step along the track portion, the conveying device thus moving trays stepwise along the track portions during the travel along the track portions.

4. The high-rise building according to claim 1, wherein each track portion includes a straight path with a straight length axis and at least one curved part with a curved length axis, in which said curved length axis has a change of direction of about 90°, and where a first end of the curved part adjoins said straight part, and a second end of the curved part is connected to said track connector.

5. The high-rise building according to claim 1, wherein the plurality of track connectors are arranged as inclining straight paths defining said length axis of the corresponding track connector, wherein the paths are arranged for transportation of trays.

6. The high-rise building according to claim 1, wherein each one of the track portions comprises a first beam and a second beam, wherein the first beam is arranged to support a first end of the tray being closest to the building.

7. The high-rise building according to claim 1, comprising watering mechanism to intermittently provide water to the trays on the track portions, wherein the watering mechanism comprises water outlets.

8. The high-rise building according to claim 6, wherein the water outlets are arranged at a distance corresponding to the intended pitch between the trays.

9. The high-rise building according to claim 1, wherein the track portions are arranged so that the trays incline at an angle of 0.5-2 degrees relative to the horizontal plane when they are arranged on the track portions and wherein the water outlets are arranged at the beam arranged at a higher side of the trays, and wherein a water return system is arranged to collect residual water from the trays at the lower side of the track portions.

10. The high-rise building according to claim 1, comprising at least two conveying systems arranged on top of each other, so that the at least two start positions and two end positions are provided providing for the simultaneous growth of two different plant varieties.

11. The high-rise building according to claim 1, having an outlet for exhaust air from the high-rise building which is connected to an air inlet of the double-skin façade via an air filter, for allowing carbon dioxide and excess heat from the high-rise building to be utilized in the double-skin façade.

12. The high-rise building according to claim 11, having an outlet for exhaust air from the double-skin façade which is connected to an air inlet of the building via an air filter, for allowing oxygen produced in the double-skin façade to be utilized in the building.

13. The high-rise building according to claim 11, wherein the inlet for air into the double-skin façade is arranged at the bottom of the double-skin façade.

14. The high-rise building according to claim 6, wherein the second beam of each track portion is arranged to support the opposite end of the tray at a position remote from said first end.

* * * * *